US 12,440,426 B2

(12) United States Patent
Peuker et al.

(10) Patent No.: US 12,440,426 B2
(45) Date of Patent: Oct. 14, 2025

(54) DENTAL PRODUCT WITH REDUCED EXTRUSION FORCES

(71) Applicant: Solventum Intellectual Properties Company, Maplewood, MN (US)

(72) Inventors: Marc Peuker, Schondorf am Ammersee (DE); Bernd Anich, Frieding (DE); Andreas J. Boehm, Reichling (DE); Henry Loll, Gilching (DE); Timothy D. Dunbar, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 19/104,101

(22) PCT Filed: Sep. 6, 2023

(86) PCT No.: PCT/IB2023/058823
§ 371 (c)(1),
(2) Date: Feb. 14, 2025

(87) PCT Pub. No.: WO2024/057144
PCT Pub. Date: Mar. 21, 2024

(65) Prior Publication Data
US 2025/0255785 A1 Aug. 14, 2025

(30) Foreign Application Priority Data
Sep. 16, 2022 (EP) .................... 22196007

(51) Int. Cl.
A61K 6/887 (2020.01)
A61C 5/62 (2017.01)
A61K 6/71 (2020.01)

(52) U.S. Cl.
CPC ............ *A61K 6/887* (2020.01); *A61C 5/62* (2017.02); *A61K 6/71* (2020.01)

(58) Field of Classification Search
None
See application file for complete search history.

(56) References Cited

U.S. PATENT DOCUMENTS 4,074,715 A * 2/1978 Geiger ............... A61M 5/31511
604/230
4,863,072 A 9/1989 Perler
(Continued)

FOREIGN PATENT DOCUMENTS

WO 2000069393 A1 11/2000
WO 2020025485 A1 2/2020
WO 2021053408 A1 3/2021

OTHER PUBLICATIONS

Extended EP Search Report for EP22196007.3, mailed Mar. 7, 2023, 7 pages.
(Continued)

*Primary Examiner* — Peter A Salamon

(57) ABSTRACT

The invention relates to a dental product comprising a packaging device comprising a compartment with a front end and a rear end, an inner surface and an inner diameter, a layer of lubricant composition on the inner surface of the compartment, a dental material located in the compartment between the front end and the rear end, the lubricant composition comprising a monomer ML with an ethylenically unsaturated group, and filler FL in an amount of 0 to 65 wt. % with respect to the weight of the lubricant composition, the dental material being different with respect to its chemical composition from the lubricant composition.

15 Claims, 5 Drawing Sheets

(56) References Cited

U.S. PATENT DOCUMENTS

| | | | | |
|---|---|---|---|---|
| 5,032,461 | A * | 7/1991 | Shaw | B05D 3/068 427/255.6 |
| 5,186,972 | A * | 2/1993 | Williams | C10M 107/50 427/398.1 |
| 5,331,019 | A * | 7/1994 | Payne, Jr. | C08K 5/3435 524/99 |
| 5,603,701 | A | 2/1997 | Fischer | |
| 5,880,075 | A * | 3/1999 | Hartley | C10M 127/06 508/501 |
| 6,126,922 | A | 10/2000 | Rozzi et al. | |
| 6,165,566 | A * | 12/2000 | Tropsha | B05D 1/60 427/535 |
| 6,243,938 | B1 * | 6/2001 | Lubrecht | A61M 5/31513 29/458 |
| 6,572,693 | B1 * | 6/2003 | Wu | A61K 6/70 106/35 |
| 6,790,037 | B1 | 9/2004 | Orecchia | |
| 7,077,826 | B1 * | 7/2006 | Gray | A61M 5/3137 604/212 |
| 7,648,487 | B2 * | 1/2010 | Ito | C10M 169/06 604/230 |
| 8,777,906 | B1 * | 7/2014 | Gray | A61M 5/315 604/189 |
| 9,782,542 | B2 * | 10/2017 | Conzone | A61M 5/31513 |
| 10,016,257 | B2 * | 7/2018 | Pauser | A61C 1/0061 |
| 10,231,810 | B2 | 3/2019 | Gramann | |
| 10,758,126 | B2 | 9/2020 | Geldmacher | |
| 11,351,009 | B2 | 6/2022 | Clark | |
| 2012/0252709 | A1 * | 10/2012 | Felts | A61M 5/3129 508/100 |
| 2016/0296962 | A1 | 10/2016 | Maxa | |
| 2017/0065495 | A1 * | 3/2017 | Eckert | A61K 6/62 |
| 2020/0069532 | A1 * | 3/2020 | Thalacker | C08F 130/02 |
| 2021/0008285 | A1 * | 1/2021 | Okihara | A61J 1/2096 |
| 2021/0030970 | A1 * | 2/2021 | Van Voorhees | A61M 5/3129 |
| 2021/0059788 | A1 * | 3/2021 | Kemeny | A61M 5/31511 |
| 2021/0146054 | A1 * | 5/2021 | Cully | A61K 9/0019 |
| 2022/0023538 | A1 | 1/2022 | Boehm | |

OTHER PUBLICATIONS

International Search Report for PCT International Application No. PCT/IB2023/058823, mailed on Oct. 13, 2023, 4 pages.

* cited by examiner

| SECTION 3: Composition/information on ingredients | | |
|---|---|---|
| Ingredient | C.A.S. No. | % by Wt |
| Silane Treated Ceramic | 444758-98-9 | 60- 10 Trade Secret * |
| Bisphenol A Diglycidyl Ether Dimethacrylate (BISGMA) | 1565-94-2 | 1- 10 Trade Secret * |
| Bisphenol A Polyethylene Glycol Diether Dimethacrylate (BISEMA-6) | 41637-38-1 | 1- 10 Trade Secret * |
| Diurethane Dimethacrylate (UDMA) | 72869-86-4 | 1- 10 Trade Secret * |
| Silane Treated Silica | 248596-91-0 | 1- 10 Trade Secret * |
| Silane Treated Zirconia | None | 1- 10 Trade Secret * |
| Polyethylene Glycol Dimethacrylate (PEGDMA) | 25852-47-5 | < 5 Trade Secret * |
| Triethylene glycol dimethacrylate | 109-16-0 | < 1 Trade Secret * |
| Phenyl bis(2,4,6-trimethylbenzoyl)-phosphine oxide | 162881-26-7 | < 0.05 Trade Secret * |

*FIG. 4*

| SECTION 3: Composition/information on ingredients | | |
|---|---|---|
| Ingredient | C.A.S. No. | % by Wt |
| Silane Treated Ceramic | 444758-98-9 | 50- 60 Trade Secret * |
| Substituted Dimethacrylate | 27689-12-9 | 15- 25 Trade Secret * |
| Bisphenol A Diglycidyl Ether Dimethacrylate (BISGMA) | 1565-94-2 | 5- 10 Trade Secret * |
| Silane Treated Silica | 248596-91-0 | 5- 10 Trade Secret * |
| Triethylene glycol dimethacrylate | 109-16-0 | < 10 Trade Secret * |
| Poly[oxy(l-oxo-1,6-hexanediyl)], a,a'-(oxidi-2,1-ethenediyl)bis[[[[2-[(2-methyl-i-oxo-2-propen-i-yl)oxy]ethyl]amino]carbonyl]oxy]- | 220182-22-9 | 1- 5 Trade Secret * |
| Ytterbium Fluoride (YbF3) | 13760-80-0 | 1- 5 Trade Secret * |
| N,N-DIMETHYLBENZOCAINE | 10287-53-3 | < 0.3 Trade Secret * |
| Diphenyliodonium Hexafluorophosphate | 58109-40-3 | < 0.2 Trade Secret * |

FIG. 5

| SECTION 3: Composition/information on ingredients | | |
|---|---|---|
| Ingredient | C.A.S. No. | % by Wt |
| Silane Treated Ceramic | 444758-98-9 | 60- 70 Trade Secret * |
| Aromatic Urethane Dimethacrylate | 1431303-59-1 | 10- 20 Trade Secret * |
| 1,12-Dodecane Dimethacrylate (DDDMA) | 72829-09-5 | < 10 Trade Secret * |
| Diurethane Dimethacrylate (UDMA) | 72869-86-4 | 1- 10 Trade Secret * |
| Silane Treated Silica | 248596-91-0 | 1- 10 Trade Secret * |
| Ytterbium Fluoride (YbF3) | 13760-80-0 | 5- 10 Trade Secret * |
| Water | 7732-18-5 | < 5 Trade Secret * |
| Silane Treated Silica | None | < 5 Trade Secret * |

FIG. 6

SECTION 3: Composition/information on ingredients

- 3.2 Chemical characterisation: Mixtures
- Description:
  Only substances required to be mentioned according to Annex II of regulation 1907/2006 are listed. Information on the other substances that may be present can be obtained upon request.

Dangerous components:

| | | |
|---|---|---|
| CAS: 41637-38-1 | Esterification products of 4,4'-isopropylidenediphenol, ethoxylated and 2-methylprop-2-enoic acid. Aquatic Chronic 4, H413 | 10-<25% |
| CAS: 43048-08-4 EINECS: 256-062-6 | (octahydro-4,7-methano-1H-indenediyl)bis9methalene) bismethacrylate Skin Irrit. 2, H315; Eye Irrit. 2, H319; Skin Sens. 1, H317;STOT SE 3, H335 | 5-<10% |
| CAS: 1985-51-9 EINECS: 217-856-8 | 2,2-dimethyl-1,3-propanediyl bismethylacrylate Skin Irrit. 2, H315; Eye Irrit. 2, H319 | 2.5-<5% |
| CAS: 128-37-0 EINECS: 204-881-4 | Butylated hydrozytoluene Aquatic Acute 1, H400; Aquatic Chronic 1, H410 | 0.5-<1% |
| CAS: 9003-08-1 | 1,3,5-Triazine-2,4,6-triamene, polymer with formaldehyde Eye Dam. 1, H318; Skin Sens. 1, H317; STOT SE 3, H335 | 0.2-<0.5% |
| CAS: 75980-60-8 EINECS: 278-355-8 Index number: 015-203-00-X | diphenyl(2,4,6-trimethylbenzoyl)phosphine oxide Repr. 2, H361f | 0.2-<0.5% |
| CAS: 72869-86-4 EINECS: 276-957-5 | Urethane Dimethacrylate (UDMA) Skin Sens. 1, H317 | 0.2-<0.5% |
| CAS: 240-22-4 EINECS: 219-470-5 | 2-(2H-benzotriazol-2-yl)-p-cresol Acute tox. 2, H330; Aquatic Chronic 1, H410; Skin Sens. 1, H317 | ≥0.2-<0.5% |
| CAS: 109-16-0 EINECS: 203-652-6 | 2,2'-ethylenedioxydiethyl dimethacrylate Skin Sens. 1, H317 | 0.2-<0.5% |
| CAS: 1879-09-0 EINECS: 217-533-1 | 6-tert-butyl-2,4-xylenol Acute Tox 2, H310,STOT RE 2, H373; Aquatic Chronic 2, H411; Acute Tox. 4, H302; Skin Irrit.2, H315; Eye Irrit. 2, H319 | 0.1-<0.2% |

*FIG. 7*

DENTAL PRODUCT WITH REDUCED EXTRUSION FORCES

CROSS REFERENCE TO RELATED APPLICATIONS

This application is a national stage filing under 35 U.S.C. 371 of PCT/IB2023/058823, filed Sep. 6, 2023, which claims the benefit of European Patent Application No. 22196007.3, filed Sep. 16, 2022, the disclosure of which is incorporated by reference in its/their entirety herein.

FIELD OF THE INVENTION

The invention relates to a dental product comprising a packaging device comprising a compartment, preferably a tubular-shaped compartment, wherein the inner surface of the compartment comprises a layer of a lubricant composition which comprises an ethylenically unsaturated monomer. The dental product further comprises a dental material, in particular a polymerizable dental material located in the compartment.

Due to the presence of the lubricant composition, the forces needed for dispensing the dental material from the packaging device can be reduced.

BACKGROUND

Dental materials, in particular dental composite material, are widely used for restoring defect dental tooth structure in the mouth of a patient.

Dental materials often contain polymerizable (meth)acrylate components, filler and an initiator system suitable for hardening the dental material by applying radiation.

In particular, dental composite materials typically have a high filler load which is needed for achieving adequate mechanical properties after hardening of the material.

The high filler load usually results in a high viscous material which needs to be adequately stored before use to avoid an undesired polymerization.

As suitable packaging devices screw tubes and so-called compules are often proposed.

Both packaging devices allow the extrusion of the stored dental composite material through a nozzle to a dental surface to be treated.

However, due to the high viscosity of the dental composite material high extrusion forces are typically required.

The high extrusion forces can either be achieved by using a screw thread with an adequate piston or by using a suitable applier.

Packaging devices for storing dental material are described in various patent documents.

U.S. Pat. No. 5,603,701 (Fischer) describes a syringe apparatus for delivering solid, yet pliable materials, such as dental composites. The syringe apparatus comprises an unthreaded barrel means for containing the material. The unthreaded barrel means has an inlet end, an outlet end, and an enlarged finger grip at the inlet end. The syringe apparatus also comprises means for slidably engaging the finger grip of the barrel means, the engaging means having a threaded throughbore. The syringe apparatus further comprises a plunger means for movement through the barrel means.

U.S. Pat. No. 4,863,072 (Perler) describes an apparatus for the delivery of light-curable composite dental filling material comprises a tubular composite reservoir, plunger and slider. The slider is free to move longitudinally along the reservoir but is matingly mounted to facets on the outside surface of the reservoir to prevent angular movement of the slider relative to the reservoir. The plunger consists of a shaft threaded to mate with the threaded inside diameter of the composite reservoir.

U.S. Pat. No. 11,351,009 B2 (Clark et al.) describes a capsule for use in a dental composite dispenser, comprising a hollow body with a wall defining an interior space of the body, the body including a proximal end and a distal end having a dispensing orifice: a first composite resin positioned in the interior space of the body; and a second composite resin positioned in the interior space of the body, wherein the first composite resin has a first viscosity, the second composite resin has a second viscosity less than the first viscosity, wherein no barrier is positioned between the first composite resin and the second composite resin, wherein the second composite resin is configured to be extruded through the dispensing orifice prior to the first composite resin, and wherein the first composite resin and the second composite resin are in contact before use of the capsule in the dental composite dispenser.

US 2022/023538 A1 (Boehm et al.) describes a syringe for storing and dispensing a first and a second component of a material. The syringe has a first chamber containing the first component and a second chamber containing the second component. The syringe further has an empty blank chamber that spaces the first and second chamber from each other.

US 2016/296962 A1 (Maxa) describes devices for dispensing compositions, the device having a tip (72) including an inner tapered funnel portion (74): a hollow barrel (84) including an outer tapered surface portion (86), an inner surface, an open front end, and an open back end opposite the front end; and a piston (16), where the outer tapered surface portion of the barrel aligns and releasably engages with the inner tapered funnel portion of the tip, and where the piston is in sliding engagement with the barrel.

Similarly, appliers for dispensing dental composite materials from packaging devices are also described in the patent literature.

U.S. Pat. No. 6,790,037 B1 (Orecchia) describes a viscous material dispenser for applying a viscous dental material from a capule, cartridge or capsule. The dispenser includes a locking mechanism mounted on the syringe type dispenser to securely retain the capule, cartridge or capsule within the syringe type dispenser while the viscous material is being applied from the syringe type dispenser.

U.S. Pat. No. 10,016,257 B2 (Pauser) describes a pen-like dispenser for dispensing a dental material has a handle and a cover which are attached for rotation relative to each other about a longitudinal axis of the dispenser, and a cartridge for holding the dental material and a screw plunger for extruding the dental material from the cartridge by screwing action.

For reducing the application force, it has also been suggested to warm the dental composite materials and thus reduce the viscosity.

Devices and processes for warming dental composite materials are e.g., described in WO 2021/053408 A1 (3M), WO 2020/025485 A1 (Voco).

Further, it was observed that the application of high forces to high viscous dental composite materials may cause a so-called "run-on" of the dental composite material even after the dispensing is completed, because during the extrusion process the high viscous dental composite material often expands the cartridge in length and diameter and needs an appropriate time to relax after the extrusion force has been applied by the screw/thread.

SUMMARY OF INVENTION

Thus, there is still a general need for addressing one or more of the issues mentioned above.

In particular, there is a need for a product and method allowing an easy extrusion or dispensing of e.g., a high viscous dental material from a packaging device.

Ideally, the means for solving this object should not negatively affect the performance and mechanical properties of the dental material after hardening.

Further, if possible, the "run-on issue" when dispensing high-viscous dental materials from packaging devices mentioned above should also be addressed.

Further, if possible, the product should be easy to produce and sufficiently storage stable. In one embodiment the invention features a dental product comprising
- a packaging device comprising a compartment with a front end and a rear end, an inner surface and an inner diameter,
- a layer of lubricant composition on the inner surface of the compartment,
- a dental material located in the compartment between the front end and the rear end, the lubricant composition comprising
- a monomer ML with an ethylenically unsaturated group, and
- filler FL in an amount of 0 to 65 wt. % with respect to the weight of the lubricant composition, the dental material being different with respect to its chemical composition from the lubricant composition.

In another embodiment, the invention relates to a process for producing a dental product, in particular the dental product described in the present text, the process comprising the steps of
- providing a packaging device comprising a compartment with a front end and a rear end, an inner surface and an inner diameter, a dental material, and a lubricant composition,
- applying a layer of a lubricant composition to the inner surface of the compartment,
- filling the compartment to which the layer of lubricant composition has been applied with the dental material.

A further embodiment of the invention is directed to process for dispensing a dental material from the dental product described in the present text or the product obtainable by the process described in the present text, the process for dispensing comprising the steps of applying force to the dental material located at the rear end of the compartment of the packaging device, the force being in a range of 5 to 60 N.

The invention is also related to a kit of part the dental product described in the present text an applier for dispensing the dental material from the packaging device, and optionally one or more of the following: a dental adhesive: a dental primer: a dental cement: a dental curing light: an instruction for use.

Moreover, the invention features the use of a lubricant composition for reducing the extrusion forces needed for dispensing a dental material from a packaging device comprising a compartment, the lubricant composition, the dental material and the packaging device being as described in the present text.

Unless defined differently, for this description the following terms shall have the given meaning:

A "dental product" means a product intended to be used in dental practice. Dental products typically contain dental materials which are stored in packaging devices before use.

A "dental material" means a material intended to be used in dental practice. More particularly, dental materials include dental composite materials, dental cements, dental adhesives, dental crown and bridge materials.

Dental materials are typically hardenable compositions, which can be hardened at ambient conditions, including a temperature range of 15 to 50° C. or 20 to 40° C. within a time frame of 30 min or 20 min or 10 min.

Higher temperatures are not recommended as they might cause pain to the patient and may be detrimental to the patient's health.

Dental materials are typically provided to the practitioner in comparable small volumes, that is volumes in the range of 0.1 to 100 ml or 0.5 to 50 ml or 1 to 30 ml.

A "dental composite material" means a material suitable for producing dental restoration. Dental composite materials typically comprise (meth)acrylate monomers, fillers and an initiator system. Dental composite materials are typically formulated as one-part composition.

"Dental restoration" means dental articles which are used for restoring a tooth to be treated. Examples of dental restorations include crowns, bridges, inlays, onlays, veneers, facings, copings, crown and bridged framework, and parts thereof.

The term "compound" or "component" is a chemical substance which has a certain molecular identity or is made of a mixture of such substances, e.g., polymeric substances.

A "hardenable or curable or polymerizable component" is any component which can be cured or solidified in the presence of a photo-initiator by radiation-induced polymerization. A hardenable component may contain only one, two, three or more polymerizable groups. Typical examples of polymerizable groups include unsaturated carbon groups, such as a vinyl group being present i.a. in a (methyl)acrylate group.

As used herein, "(meth)acryl" is a shorthand term referring to "acryl" and/or "methacryl". For example, a "(meth) acryloxy" group is a shorthand term referring to either an acryloxy group (i.e., $CH_2=CH-C(O)-O-$) and/or a methacryloxy group (i.e., $CH_2=C(CH_3)-C(O)-O-$).

As used herein, "hardening" or "curing" a composition are used interchangeably and refer to polymerization and/or crosslinking reactions including, for example, photo-polymerization reactions and chemical-polymerization techniques (e. g., ionic reactions or chemical reactions forming radicals effective to polymerize ethylenically unsaturated compounds) involving one or more materials included in the composition.

An "initiator or initiator system" is a component or a combination of components being able to start the curing process of a hardenable component.

A "particle" means a substance being a solid having a shape which can be geometrically determined. The shape can be regular or irregular. Particles can typically be analysed with respect to e.g., particle size and particle size distribution.

A "nano-sized filler" means a filler having an average particle size in the range of 5 to 50 nm.

"Ambient conditions" mean the conditions which the composition described in the present text is usually subjected to during storage and handling. Ambient conditions may, for example, be a pressure of 900 to 1,100 mbar, a temperature of 10 to 40° C. and a relative humidity of 10 to 100%. In the laboratory ambient conditions are typically adjusted to 20 to 25° C. and 1,000 to 1,025 mbar (at maritime level).

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The terms "comprise" or "contain" and variations thereof do not have a limiting meaning where these terms appear in the description and claims. "Consisting essentially of" means that specific further components can be present, namely those which do not materially affect the essential characteristic of the article or composition. "Consisting of" means that no further components should be present. The term "comprise" shall include also the terms "consist essentially of" and "consists of".

A composition is "essentially or substantially free of" a certain component, if the composition does not contain said component as an essential feature. Thus, said component is not willfully added to the composition either as such or in combination with other components or ingredient of other components. A composition being essentially free of a certain component usually does not contain that component at all. However, sometimes the presence of a small amount of the said component is not avoidable e.g., due to impurities contained in the raw materials used. "Essentially free of" typically means a content of less than 1, 0.5 or 0.1 wt. %.

BRIEF DESCRIPTION OF FIGURES

FIG. 4-7 outline the composition of various commercially available dental materials.

DETAILED DESCRIPTION

Figure 1:
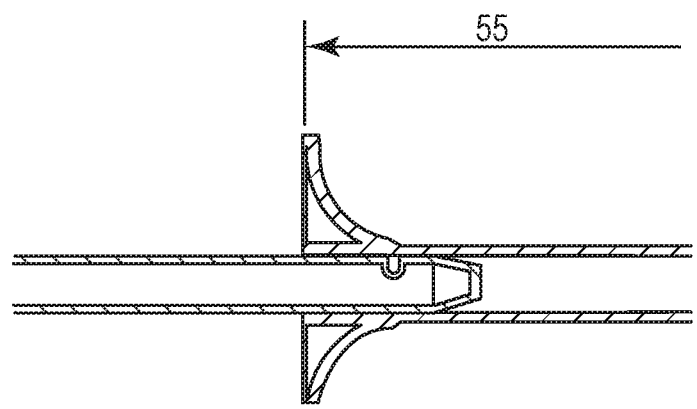
FIG. 1 a schematic view of the packaging device used for testing the extrusion behaviour of a dental material.

It has been found that the dental product described in the text has a couple of advantageous properties.

It was found that using a lubricant layer on the inner surface of the tubular-shaped compartment of the packaging device results in a reduction of the friction between the dental material and the material of the packaging device and thus in a reduction of the force which is needed for dispensing the dental material from the packaging device.

If the lubricant composition comprises a (meth)acrylate monomer, that is, a component which is typically compatible with chemical compositions of dental materials, the (meth) acrylate monomer can later be co-polymerized with the dental material and thus does not negatively affect the overall performance of the dental material after hardening.

This is an advantage compared to using e.g., silicone oil as lubricant which may have a negative impact on the adhesion properties of the dental material and other mechanical properties of the dental material during and after hardening.

Further, it was found that the so-called "run on issue" could be mitigated as the force which is typically needed for dispensing the dental material from the packaging device can be reduced.

The dental product described in the present text is also easy to handle for the practitioner as he typically just has to push a piston rod which is a kind of "one-hand application". This is a benefit compared to screw tube packaging systems which require two hands during the extrusion process.

Thus, the dental material can be expressed more easily and faster from the packaging device.

The packaging device is also easy to produce. Only a few parts are needed, such as the compartment, optionally a plunger for sealing, and optionally a nozzle for dispensing the dental material from the packaging device.

Further, as the extrusion force has been reduced, the thickness of the wall of the compartment of the packaging device can be reduced as well without running the risk of deformation of the packaging device during the extrusion process.

This is also beneficial from an environment aspect as less material is needed for producing the packaging device. This may also reduce the production costs.

The invention relates to a dental product containing a dental material.

Dental materials are typically provided to the practitioner under hygienic conditions. During storage, the dental materials are typically packaged in a suitable packaging device.

The dental product of the present text comprises a packaging device with a compartment, in particular a tubular-shaped compartment.

The compartment comprises a front end and a rear end and has an inner and an outer surface and an inner diameter.

The inner surface, the front end and the rear end define the volume of the compartment of the packaging device which is available and accessible for storing a dental material.

On the inner surface of the compartment there is a layer of a lubricant composition.

The compartment has a front end and a rear end, an inner surface and an inner diameter.

The length of the compartment essentially defines the volume of packaging device which is available for receiving the dental material to be stored in the packaging device.

The volume of the compartment is typically in a range of 0.1 ml to 100 ml or 0.5 to 50 ml or 1 to 30 ml.

The inner diameter of the compartment is typically in the range of 2 to 25 mm. The outer diameter of the compartment is typically in the range of 4 to 30 mm. Thus, the wall-thickness of the compartment is typically in the range of 0.5 to 2 mm.

The ratio of length to inner diameter of the compartment is typically in the range of 25/1 to 3/1.

Such a ratio was found to be useful as it provides a good balance between the diameter available for transferring force to the dental material during the extrusion process and handling of the dental product by the practitioner.

Preferably, the compartment has a tubular shape.

Overall, the packaging device may have the shape of a syringe with a tubular hollow barrel with a front end and a rear end opposite the front end.

Within the compartment, in particular at the rear end of the compartment, a piston can be inserted, which is in sliding engagement with the inner surface of the compartment. That is, the piston is movable within the compartment.

The piston is also for sealing the rear end of the compartment and for transferring pressure to the dental material during the extrusion or dispensing process.

The packaging device may further comprise a nozzle at the front end of the compartment, through which the dental material can be dispensed. The nozzle may be releasably engaged or attached to the compartment.

The compartment may comprise a tapered funnel section at the front end. The tapered funnel section may comprise a conical inner surface.

Figure 2:
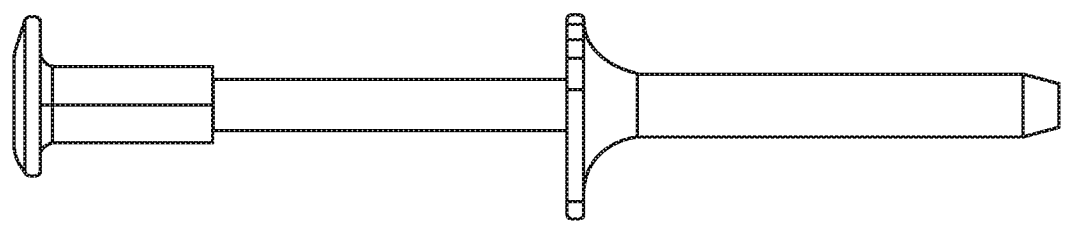
FIG. 2 shows a schematic sample of a packaging devices according to the invention useful for storing dental materials.
Figure 3:
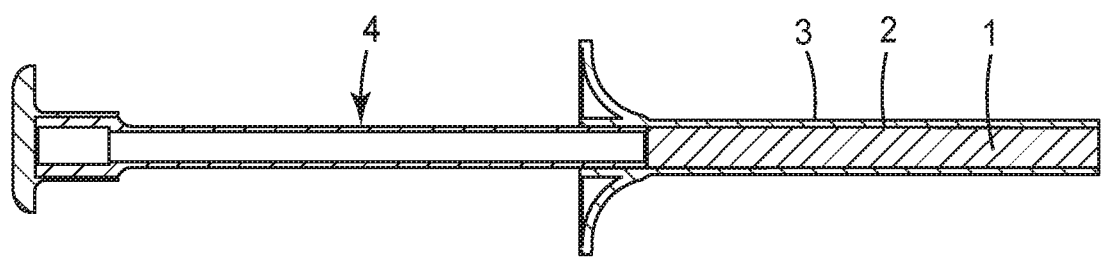
FIG. 3 shows a schematic sample of a packaging device according to the invention containing the lubricant composition and a dental material.

Examples for packaging devices which can be used are shown in FIGS. 1 to 3.

In FIG. 1 the packaging device used in the examples is shown. The packaging device comprises a compartment for storing the dental material. A plunger with a tapered front end is partially inserted in the compartment. The length of the department is 55 mm. At the left end of the compartment, the device comprises a plate for better handling the device during the dispensing step.

Compared to the packaging device shown in FIG. 1, the packaging device shown in FIG. 2 has a nozzle at the front end. The nozzle has a tapered shape.

FIG. 3 shows a further embodiment of the dental article described in the present text.

In FIG. 3, (1) refers to a dental material stored in the compartment of the packaging device.

(2) refers to the lubricant composition being located on the inner wall of the compartment of the packaging device.

(3) refers to the housing of the packaging device, in particular the compartment.

(4) refers to a plunger or piston which can be inserted into the compartment and which can be used for dispensing the dental product.

The dental material can be dispensed out of the compartment by moving the piston (4) in the direction to the front end of the packaging device. The piston can be moved either manually or with the aid of an application device or applier designed to receive the dental product (e.g., an application device having the shape of a caulk gun).

On the inner surface of the compartment of the packaging device there is located a layer of a lubricant composition.

Typically, the thickness of the layer of the lubricant composition is in a range of 1 to 500 µm or 2 to 300 µm.

If desired, the thickness of the layer can be determined with a microscope by cutting the packaging device and inspecting the interface of the dental material and the inner wall of the compartment.

The lubricant composition comprises a monomer ML with an ethylenically unsaturated group and optionally a filler FL.

The viscosity of the lubricant composition is typically in the range of 1 to 10,000 Pa*s or 10 to 1,000 Pa*s or 20 to 800 Pa*s at a temperature of 25° C. and a shear rate of 10 s$^{-1}$, wherein a range of 10 to 1,000 Pas or 20 to 800 Pa*s is sometimes preferred.

Such a viscosity was found to be useful as it facilitates the coating of the inner surface of the compartment of the packaging device during production.

The viscosity is sufficiently low for enabling a homogenous coating and sufficiently high for reducing the risk that the lubricant composition drops or flows down from the inner surface of the compartment of the packaging device.

Monomer ML typically has a molecular weight in the range of 130 to 1,200 g/mol or 130 to 1,000 g/mol or 130 to 800 g/mol or 130 to 600 g/mol.

The lubricant composition comprises (meth)acrylate monomers, that is, components which can be copolymerized with other polymerizable components which are typically present in a dental material.

Suitable polymerizable components can be characterized by the following formula:

with A being an ethylenically unsaturated group, such as a (meth)acryl moiety,

B being selected from (i) linear or branched $C_1$ to $C_{12}$ alkyl, optionally substituted with other functional groups (e.g. halogenides (including Cl, Br, I), OH or mixtures thereof) (ii) $C_6$ to $C_{12}$ aryl, optionally substituted with other functional groups (e.g. halogenides, OH or mixtures thereof), or (iii) organic group having 4 to 20 carbon atoms bonded to one another by one or more ether, thioether, ester, thioester, thiocarbonyl, amide, urethane, carbonyl and/or sulfonyl linkages, m, n being independently selected from 0, 1, 2, 3, 4, 5 or 6 with the proviso that n+m is greater 0, that is that at least one A group is present.

Such polymerizable materials include mono-, di- or polyacrylates and methacrylates such as methyl acrylate, methyl methacrylate, ethyl (meth)acrylate, isopropyl (meth)acrylate, n-hexyl (meth)acrylate, stearyl (meth)acrylate, allyl (meth)acrylate, glycerol di(meth)acrylate, the diurethane dimethacrylate called UDMA (mixture of isomers, e.g. Röhm Plex 6661-0) being the reaction product of 2-hydroxyethyl methacrylate (HEMA) and 2,2,4-trimethylhexamethylene diisocyanate (TMDI), glycerol tri(meth)acrylate, ethyleneglycol di(meth)acrylate, diethyleneglycol di(meth)acrylate, triethyleneglycol di(meth)acrylate (TEGDMA), 1,3-propanediol diacrylate, 1,3-propanediol dimethacrylate, 1,6 hexanediol di(meth)acrylate, 1,10 decanediol di(meth)acrylate, 1,12 tri(meth)acrylate, 1,2,4-butanetriol dodecanediol di(meth)acrylate, trimethylolpropane tri(meth)acrylate, 1,4-cyclohexanediol di(meth)acrylate, pentaerythritol tri(meth)acrylate, pentaerythritol tetraacrylate, pentaerythritol tetramethacrylate, sorbitol hexa(meth)acrylate, bis [1-(2-(meth)acryloxy)]-p-ethoxyphenyldimethylmethane, and trishydroxyethyl-isocyanurate trimethacrylate: the bis-acrylates and bis-methacrylates of polyethylene glycols of molecular weight 200 to 500, and vinyl compounds such as styrene, divinyl succinate, divinyl adipate and divinylphthalate. Mixtures of two or more of these free radically polymerizable materials can be used if desired.

Monomers comprising a hydroxyl moiety can also be added. Suitable compounds include 2-hydroxyethyl (meth)acrylate (HEMA), 2- or 3-hydroxypropyl (meth)acrylate, 4-hydroxybutyl (meth)acrylate, 5-hydroxypentyl (meth)acrylate, 6-hydroxyhexyl (meth)acrylate, 10-hydroxydecyl (meth)acrylate, dialkylene glycol mono(meth)acrylate, for example, diethylene glycol mono(meth)acrylate, triethylene glycol mono(meth)acrylate, tetraethylene glycol mono(meth)acrylate, polyethylene glycol mono(meth)acrylate, dipropylene glycol mono(meth)acrylate, polypropylene glycol mono(meth)acrylate, and further 1,2- or 1,3- and 2,3-dihydroxypropyl (meth)acrylate, 2-hydroxypropyl-1,3-di(meth)acrylate, 3-hydroxypropyl-1,2-di(meth)acrylate, N-(meth)acryloyl-1,2-dihydroxypropylamine, N-(meth)acryloyl-1,3-dihydroxypropylamine, adducts of phenol and glycidyl (meth)acrylate, for example, 1-phenoxy-2-hydroxypropyl (meth)acrylate, 1-naphthoxy-2-hydroxypropyl (meth)acrylate, 2-hydroxyethyl (meth)acrylate, 2-hydroxypropyl (meth)acrylate and 2,3-dihydroxypropyl (meth)acrylate are particularly preferable. If desired, mixtures of one or more of these components can be used.

The lubricant composition typically comprises monomer(s) ML in the following amounts: at least: 5 or 10 or 20 wt. %; at most: 100 or 80 or 65 wt. %; range: 5 to 100 or 10 to 80 or 20 to 65 wt. %; wt. % with respect to the weight of the lubricant composition.

The lubricant composition may further comprise filler. One or more fillers can be present.

Adding a filler can be beneficial e.g., for adjusting the rheological properties like viscosity.

The size of the filler particles should be such that a homogeneous mixture with the hardenable components of the lubricant composition can be obtained.

The average particle size of the fillers is typically in a range of 0.4 to 10 μm.

If desired, the measurement of the particle size of the filler particles can be done as described in the example section.

Useful fillers include fumed silica, fillers based on non-acid reactive fluoroaluminosilicate glasses, quartz, ground glasses, non water-soluble fluorides such as $CaF_2$, silica gels such as silicic acid, in particular pyrogenic silicic acid and granulates thereof, cristobalite, calcium silicate, zirconium silicate, zeolites, including the molecular sieves.

Suitable fumed silicas include for example, products sold under the tradename Acrosil™ series OX-50, -130, -150, and -200, Acrosil™ R8200, R805 available from Evonik, CAB-O-SIL™ M5 available from Cabot Corp (Tuscola), and HDK types e.g. HDK™-H2000, HDK™ H15, HDK™ H18, HDK™ H20 and HDK™ H30 available from Wacker.

Filler(s) which can also be used include nano-sized fillers such as nano-sized silica or a mixture of nano-sized silica and zirconia particles. Suitable nano-sized particles typically have an average particle size in the range of 5 to 50 nm.

Preferred nano-sized silicas are commercially available from Nalco Chemical Co. (Naperville, Ill.) under the product designation NALCO™ COLLOIDAL SILICAS (for example, preferred silica particles can be obtained from using NALCO™ products 1040, 1042, 1050, 1060, 2327 and 2329), Nissan Chemical America Company, Houston, Texas (for example, SNOWTEX-ZL, -OL, -O, -N, -C, -20L, -40, and -50); Admatechs Co., Ltd., Japan (for example, SX009-MIE, SX009-MIF, SC1050-MJM, and SC1050-MLV); Grace GmbH & Co. KG, Worms, Germany (for example, those available under the product designation LUDOX™, e.g., P-W50, P-W30, P-X30, P-T40 and P-T40AS); Akzo Nobel Chemicals GmbH, Leverkusen, Germany (for example, those available under the product designation LEVASIL™, e.g., 50/50%, 100/45%, 200/30%, 200A/30%, 200/40%, 200A/40%, 300/30% and 500/15%), and Bayer MaterialScience AG, Leverkusen, Germany (for example, those available under the product designation DISPERCOLL™ S. e.g., 5005, 4510, 4020 and 3030).

Fillers which can also be used include prepolymerized filler. Prepolymerized filler particles are typically prepared by mixing an inorganic filler with an organic polymerizable resin and curing the mixture.

If desired, fillers can be surface-treated. Useful surface treatment agents include silanes. Silane surface treating agents often comprise a polymerizable moiety, in particular a (meth)acrylate moiety. Surface treating allows an easier dispersing of the nano-sized filler particles in the monomer matrix and may prevent settling of the fillers from the formulation during storage.

The lubricant composition may comprise filler(s) in the following amounts: at least: 0 or 1 or 5 wt. %; at most: 65 or 50 or 40 wt. %; range: 0 to 65 or 1 to 50 or 5 to 40 wt. %; wt. % with respect to the weight of the lubricant composition.

The lubricant composition may further comprise an initiator. One or more initiators may be present.

Suitable initiators which can be present include photo-initiator systems and redox-initiator systems.

Suitable photo-initiator systems often contain a sensitizer comprising an alpha-alpha di-keto moiety, an anthraquinone moiety, a thioxanthone moiety or benzoin moiety. Sensitizers containing an alpha-alpha di-keto moiety are often preferred.

Typical photo-initiator systems comprise a combination of a sensitizer and a reducing agent or donor component, which is often referred to as photo-initiator system.

As sensitizer, those which can polymerize the polymerizable monomer(s) by the action of a visible light having a wavelength of from 390 nm to 830 nm are preferred.

Examples of sensitizers include camphorquinone, benzil, diacetyl, benzyl dimethyl ketal, benzyl diethyl ketal, benzyl di(2-methoxyethyl) ketal, 4,4,'-dimethylbenzyl dimethyl ketal, anthraquinone, 1-chloroanthraquinone, 2-chloroanthraquinone, 1,2-benzanthraquinone, 1-hydroxy-anthraquinone, 1-methylanthraquinone, 2-ethylanthraquinone, 1-bromoanthraquinone, thioxanthone, 2-isopropyl thioxanthone, 2-nitrothioxanthone, 2-methyl thioxanthone, 2,4-dimethyl thioxanthone, 2,4-diethyl thioxanthone, 2,4-diisopropyl thioxanthone, 2-chloro-7-trifluoromethyl thioxanthone, thioxanthone-10,10-dioxide, thioxanthone-10-oxide, benzoin methyl ether, benzoin ethyl ether, isopropyl ether, benzoin isobutyl ether, benzophenone, bis(4-dimethylamino-phenyl) ketone, 4,4,'-bisdiethylaminobenzophenone.

Alternatively, free-radical initiators include the class of acylphosphine oxides and bisacylphosphine oxides.

As reducing agent or donor component, tertiary amines are generally used. Suitable examples of the tertiary amines include N,N-dimethyl-p-toluidine, N,N-dimethylaminoethyl methacrylate, triethanolamine, methyl 4-dimethylaminobenzoate, ethyl 4-dimethylaminobenzoate, methyldiphenylamine and isoamyl 4-dimethylaminobenzoate.

If a redox-initiator system is present, the packaging device typically has two separate compartments for storing the dental material which is then split into one portion containing the oxidizing agent and one portion containing the reducing agent of the redox-initiator system.

As oxidizing agents, typically peroxy components such as peroxides can be used.

In addition persulfate components, in particular water-soluble persulfate components, can be used.

Organic peroxides which can be used include di-peroxides and hydroperoxides.

According to one embodiment, the organic peroxide is a di-peroxide, preferably a di-peroxide comprising the moiety $R_1$—O—O—$R_2$—O—O—$R_3$, with $R_1$ and $R_3$ being independently selected from H, alkyl (e.g. $C_1$ to $C_6$), branched alkyl (e.g. $C_1$ to $C_6$), cycloalkyl (e.g. $C_5$ to $C_{10}$), alkylaryl (e.g. $C_7$ to $C_{12}$) or aryl (e.g. $C_6$ to $C_{10}$) and $R_2$ being selected from alkyl (e.g. ($C_1$ to $C_6$) or branched alkyl (e.g. $C_1$ to $C_6$).

Examples of suitable organic di-peroxides include 2,2-Di-(tert.-butylperoxy)-butane and 2,5-Dimethyl-2,5-di-(tert-butylperoxy)-hexane and mixtures thereof.

An organic peroxide can also be a hydroperoxide, in particular a hydroperoxide comprising the structural moiety

R—O—O—H with R being (e.g., $C_1$ to $C_{20}$) alkyl, (e.g., $C_3$ to $C_{20}$) branched alkyl, (e.g., $C_6$ to $C_{12}$) cycloalkyl, (e.g., $C_7$ to $C_{20}$), alkylaryl (e.g., $C_6$ to $C_{12}$) or aryl (e.g., $C_6$ to $C_{12}$).

Examples of suitable organic hydroperoxides include t-butyl hydroperoxide, t-amyl hydroperoxide, p-diisopropylbenzene hydroperoxide, cumene hydroperoxide, pinane hydroperoxide, p-methane hydroperoxide and 1,1,3,3-tetramethylbutyl hydroperoxide and mixtures thereof.

Examples of reducing agents include barbituric acid or thiobarbituric acid components, in particular the respective salts thereof.

Examples of suitable barbituric or thiobarbituric acid components include barbituric acid, thiobarbituric acid, 1,3,5-trimethylbarbituric acid, 1-phenyl-5-benzylbarbituric acid, 1-benzyl-5-phenylbarbituric acid, 1,3-dimethylbarbituric acid, 1,3-dimethyl-5-phenylbarbituric acid, 1-cyclohexyl-5-ethylbarbituric acid, 5-laurylbarbituric acid, 5-butylbarbituric acid, 5-allylbarbituric acid, 5-phenylthiobarbituric acid, 1,3-dimethylthiobarbituric acid, trichlorobarbituric acid, 5-nitrobarbituric acid, 5-aminobarbituric acid, and 5-hydroxybarbituric acid.

Other reducing agents which can be used include aromatic sulfinic acid salts or thiourea components.

Suitable sulfinic components include benzene sulfinic acid, sodium benzene sulfinate, sodium benzene sulfinate dihydrate, sodium toluene sulfinate, formamidine sulfinic acid, sodium salt of hydroxymethane sulfinic acid, sodium salt of 2,5-dichlorobenzenesulfinic acid, 3-acetamido-4-methoxybenzenesulfinic acid, wherein sodium toluene sulfinate or sodium benzene sulfinate and their hydrates are sometime preferred.

Besides those components, activators and/or transition metal components might be present in a redox-initiator system.

Suitable activators include, tertiary aromatic amines, such as the N,N-bis-(hydroxyalkyl)-3,5-xylidines (e.g., as described in U.S. Pat. No. 3,541,068) as well as N,N-bis-(hydroxyalkyl)-3,5-di-t-butylanilines, in particular N,N-bis-([beta]-oxybutyl)-3,5-di-t-butylaniline as well as N,N-bis-(hydroxyalkyl)-3,4,5-trimethylaniline.

Suitable transition metal component(s) include organic and/or inorganic salt(s) of vanadium, chromium, manganese, iron, cobalt, nickel, and/or copper, with copper, iron and vanadium being sometimes preferred.

The lubricant composition may comprise initiator(s) in the following amounts: at least: 0 or 0.05 or 0.1 wt. %; at most: 6 or 4 or 2 wt. %; range: 0 to 6 or 0.05 to 4 or 0.1 to 2 wt. %; wt. % with respect to the weight of the lubricant composition.

The dental product described in the present text also comprises a dental material.

The dental material is located in the compartment of the packaging device. The dental material is in contact with the lubricant composition. That is, the lubricant compositions functions as an interface between the inner surface of the compartment and the dental materials stored therein.

The lubricant layer is surrounding the dental material in the area where the dental material would otherwise be in direct contact with the inner surface of the compartment of the packaging device.

The dental material is different with respect to its chemical composition from the lubricant composition.

The dental material typically comprises one or more monomers MC with an ethylenically unsaturated group.

The monomers MC can be same as or different from the monomers ML.

If they are same, they are used in different amounts.

The dental material typically comprises the monomer(s) MC in the following amounts: at least: 5 or 10 or 20 wt. %; at most: 80 or 70 or 60 wt. %; range: 5 to 80 or 10 to 70 or 20 to 60 wt. %; wt. % with respect to the weight of the lubricant composition.

The dental material further comprises filler FC.

The filler FC can be same as or different from the filler FL which may be present in the lubricant composition.

Filler FC is typically present in the following amounts: at least: 20, or 30 or 40 wt. %; at most: 85 or 70 or 65 wt. %; range: 20 to 85, or 30 to 70, or 40 to 65 wt. %; wt. % with respect to the weight of the dental material.

The dental material may further comprise an initiator.

The initiator can be same as or different from the initiator which may be present in the lubricant composition.

The dental product can be manufactured by a process comprising the steps of
providing a packaging device comprising a compartment with a front end and a rear end, an inner surface and an inner diameter, a dental material, and a lubricant composition,
applying a layer of a lubricant composition to the inner surface of the compartment,
filling the compartment to which the layer of lubricant composition has been applied with the dental material.

The lubricant composition can be applied by spraying or coating with an appropriate coating device, e.g. a sponge impregnated with the lubricant composition.

The invention also relates to a process for dispensing the dental material from the packaging device of the dental product.

The process for dispensing comprises the steps of
applying an extrusion force to the dental material located at the rear end of the compartment of the packaging device,
the extrusion force being in a range of 0, 1 to 100 N, or within a range of 10 to 60 N.

The force to be applied is typically in a range which can be provided by a practitioner without big efforts and without the need for using additional gadgets or specific packaging devices such as screw tubes.

The invention also relates to a kit of parts.

The kit of parts comprises the dental product described in the present text, an applier for dispensing the dental material from the packaging device, and optionally one or more of the following items: a dental adhesive: a dental primer: a dental cement: a dental curing light: instruction for use.

Suitable appliers include at least a hand piece and rod, optionally a lever and gear.

Dental adhesives are typically acidic dental composition with a rather low viscosity (e.g. 0.01 to 3 Pa*s at 25° C.). Dental adhesives directly interact with the enamel or dentin surface of a tooth. Dental adhesives are typically one-part compositions, are radiation-curable and comprise ethylenically unsaturated component(s) with acidic moiety, ethylenically unsaturated component(s) without acidic moiety, water, sensitizing agent(s), reducing agent(s) and additive(s).

Examples of dental adhesives are described in US 2020/0069532 A1 (Thalacker et al.) and US 2017/0065495 A1 (Eckert et al.). Dental adhesives are also commercially available, e.g. 3M™ Scotchbond™ Universal (3M Oral Care).

Suitable dental primers are described in U.S. Pat. No. 6,126,922 (Rozzi et al.) and WO 00/69393 A1 (3M). Dental primers are also commercially available, e.g. 3M™ Transbond™ XT Primer (3M Oral Care).

Dental cements which can be added to the kit include in particular self-adhesive resin cements, which contain an acidic polymerizable component (e.g. a (meth)acrylate component bearing a phosphoric or carboxylic acid moiety), polymerizable components without an acidic moiety, an initiator system and filler.

Suitable dental cements are also commercially available, such as RelyX™ Unicem 2, Rely X™ Universal or RelyX™ Luting Plus (3M Oral Care).

Suitable dental curing lights are described in U.S. Pat. No. 10,758,126 B2 (Geldmacher et al.) or U.S. Pat. No. 10,231,810 B2 (Gramann et al). Dental curing lights are also commercially available, e.g. 3M™ Elipar™ S10 or 3M™ Elipar™ DeepCure S LED curing light (3M Oral Care).

The instruction for use describes how the dental product should be used in daily practice, e.g. outlining the application steps and optional curing conditions.

The invention also relates to the use of the lubricant composition for reducing the extrusion force needed for dispensing a dental material from a packaging device comprising a compartment, the lubricant composition, the dental material and the packaging device being as described in the present text.

Particular embodiments of the dental products described in the present text include the following:

Embodiment 1

A dental product comprising
  a packaging device comprising a compartment with a front end and a rear end, an inner surface and an inner diameter,
  a layer of lubricant composition on the inner surface of the compartment,
  a dental material located in the compartment between the front end and the rear end,
  the lubricant composition comprising
  a monomer ML with an ethylenically unsaturated group, and
  filler FL in an amount of 0 to 65 wt. % with respect to the weight of the lubricant composition,
  the dental material comprising
  a monomer MC with an ethylenically unsaturated group, monomer MC being different from monomer ML,
  filler FC in an amount of 65 to 85 wt. % with respect to the weight of the dental material.

Embodiment 2

A dental product comprising
  a packaging device comprising a compartment with a front end and a rear end, an inner surface and an inner diameter,
  a layer of lubricant composition on the inner surface of the compartment,
  a dental material located in the compartment between the front end and the rear end,
  the lubricant composition comprising
  a monomer ML with an ethylenically unsaturated group, and
  filler FL in an amount of 0 to 65 wt. % with respect to the weight of the lubricant composition, and
  having a viscosity in the range of 1 to 10,000 Pa*s at a temperature of 25° C. and a shear rate of 10 s$^{-1}$,
  the dental material comprising
  a monomer MC with an ethylenically unsaturated group, monomer MC being different from monomer ML,
  filler FC in an amount of 65 to 85 wt. % with respect to the weight of the dental material.

Embodiment 3

A dental product comprising
  a packaging device comprising a compartment with a front end and a rear end, an inner surface and an inner diameter,
  a layer of lubricant composition on the inner surface of the compartment,
  a dental material located in the compartment between the front end and the rear end,
  the lubricant composition comprising
  a monomer ML with an ethylenically unsaturated group, and
  filler FL in an amount of 10 to 65 wt. % with respect to the weight of the lubricant composition, and
  having a viscosity in the range of 10 to 1,000 Pa*s at a temperature of 25° C. and a shear rate of 10 s$^{-1}$,
  the dental material comprising
  a monomer MC with an ethylenically unsaturated group, monomer MC being different from monomer ML,
  filler FC in an amount of 65 to 85 wt. % with respect to the weight of the dental material,
  the compartment of the packaging device
  having a volume in the range of 1 to 100 ml,
  the ratio of length to inner diameter of the compartment being in the range of 25/1 to 3/1.

The lubricant composition described in the present text does typically not comprise the following components alone or in combination:
  a) silicone oil in an amount of more than 0.5 or 0.2 or 0.1 wt. %;
  b) acidic polymerizable components in an amount of more than 1 or 0.5 or 0.2 wt. %.

Thus, the above-mentioned components are typically not willfully added and are essentially not present at al.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate the invention.

EXAMPLES

Unless otherwise indicated, all parts and percentages are on a weight basis, all water is de-ionized water, and all molecular weights are weight average molecular weight (Mw). Moreover, unless otherwise indicated all experiments were conducted at ambient conditions (23° C.).

Methods

Viscosity (Suitable for Materials Up to a Viscosity of 100.000 Pa*s)

If desired, viscosity can be measured with a Physica MCR 301 (Anton Paar Germany GmbH, Ostfildern-Scharnhausen). Flowable composites and monomers can be measured at 25.0° C. with a shear rate of 10/s with a 15 mm plate/plate system and a gap of 0.2 mm.

pH Value

If desired, the pH value of a composition can be determined as follows: A pH sensitive paper (Carl Roth™ company) is provided. A stripe of the pH sensitive paper is wetted. A small portion of the composition to be tested is placed on the wetted pH sensitive paper. After 5 s the colour change of the pH sensitive paper is determined.

Molecular Weight (Mw)

If desired, the average molecular weight Mw can be determined by HPLC (e.g. Perkin Elmer Series 200 with UV/VIS detector Shimadzu SPD 20AV) using an appropriate solvent or mixture of solvents. The obtained HPLC chromatogram contains distinct peaks of chemically similar compounds. From the area of the distinct peaks (area-%) and taking into account the molecular mass of the respective species, the mass-% of the respective species can be calculated.

Particle Size Distribution (Suitable for Non Nano-Sized Particles)

If desired, the particle size distribution can be determined by light-scattering, e.g., using the device Horiba (Horiba, JP). The light scattering particle-sizer illuminates the sample with a laser and analyzes the intensity fluctuations of the light scattered from the particles at an angle of 173 degrees. The method of Photon Correlation Spectroscopy (PCS) can be used by the instrument to calculate the particle size. PCS uses the fluctuating light intensity to measure Brownian motion of the particles in the liquid. The particle size is then calculated to be the diameter of sphere that moves at the measured speed.

The intensity of the light scattered by the particle is proportional to the sixth power of the particle diameter. The Z-average size or cumulant mean is a mean calculated from the intensity distribution and the calculation is based on assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones.

The Volume Distribution gives the percentage of the total volume of particles corresponding to particles in a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average will typically be a smaller value than the Z-average size. In the scope of this document the Z-average size is referred to as "average particle size".

Particle Size Distribution (Suitable for Nano-Sized Particles)

The measurement of the size of nano-particles is preferably based on a TEM (transmission electron microscopy) method, whereby a population is analyzed to obtain an average particle diameter. A preferred method for measuring the particle diameter can be described as follows:

Samples approximately 80 nm thick are placed on 200 mesh copper grids with carbon stabilized formvar substrates (SPI Supplies—a division of Structure Probe, Inc., West Chester, PA). A transmission electron micrograph (TEM) is taken, using JEOL 200CX (JEOL, Ltd. of Akishima, Japan and sold by JEOL USA, Inc.) at 200 KV. A population size of about 50-100 particles can be measured and an average diameter is determined.

Extrusion Force

Extrusion force was measured with a universal testing machine from ZwickRoell: Zwick 010, Load cell Xforce K, Nominal Force 10 kN, testing speed 0.25 mm/s.

The sample to be tested (packaging device with lubricant composition and dental material) was placed vertically in a sample holder in the universal testing machine, the front outlet was pointing downwards. On top of the syringe's plunger, the bolt with its attached load cell of the testing machine was applied to press out the composite from the syringe at ambient conditions (23° C.). During this process the applied force was recorded.

TABLE 1

Materials

| Material | Abbreviation | Source | C.A.S./Lot Number |
|---|---|---|---|
| 3M ™ Filtek ™ Universal | 3M FU | 3M Oral Care | NF43608 |
| 3M ™ Filtek ™ Supreme Flowable | 3M FSF | 3M Oral Care | NE60066 |
| 3M ™ Filtek ™ Bulk Fil Flowable | 3M FBFF | 3M Oral Care | NC29803 |
| G-aenial ™ Universal Injectable | GUI | GC | 1811141 |
| Wacker ® AK 5000 Siliconoel | Silicone oil | Wacker | AK40015 |
| Grease - glisseal ® HV | grease | borer, Switzerland | 162641 |
| Hydroxyethyl methacrylate | HEMA | | 868-77-9 |
| Triethylene glycol dimethacrylate | TEGDMA | | 109-16-0 |
| Bisphenol A-glycidyl methacrylate | Bis-GMA | | 1565-94-2 |
| Mixture of Bis-GMA and HEMA in a ratio (w/w) of 90:10 | Bis-GMA/ HEMA 90/10 | — | — |
| Mixture of Bis-GMA and HEMA in a ratio (w/w) of 50:50 | Bis-GMA/ HEMA 50/50 | — | — |

Components contained in 3M™ Filtek™ Universal are listed in section 3 of the material data sheet (FIG. 4). Components contained in 3M™ Filtek™ Supreme Flowable are listed in section 3 of the material data sheet (FIG. 5). Components contained in 3M™ Filtek™ Bulk Fill Flowable are listed in section 3 of the material data sheet (FIG. 6). Components contained in GC G-Aenial™ Universal Injectable are listed in section 3 of the material data sheet (FIG. 7).

Test Setup

The tubular-shaped packaging device used for testing is shown in FIG. 1.

The dimensions of the packaging device were as follows: Length (L): 5.5 cm; Inner diameter (ID): 6.4 mm; Outer diameter (OD): 7.7 mm. The packaging device was made of polypropylene.

A cotton swab was used to coat the inner surface of the tubular-shaped packaging device with the lubrication composition. About 0.10 g of material was used. The thickness of the coating layer is within a range of 1 to 200 μm.

Then, the dental composite material 3M FU was filled into the packaging device by extruding it from its original threaded cartridge (syringe) into the rear end of the new packaging under use of an universal testing machine (Zwick 010, Roell).

The packaging device was sealed with a plunger and stored for 1 day at room temperature before the extrusion force (Fmax), determined and analyzed (Table 2).

TABLE 2

| | | Standard Deviation (SD) given in brackets | | |
| --- | --- | --- | --- | --- |
| | Lubricant Composition | Viscosity [Pa*s] shear rate 10 [1/s], 25° C. | Extrusion Force [N] after 24 h @ ambient conditions | Extrusion Force [N] after 14 d @, 50° C. storage |
| CE1 | None | — | 68.3 (6.2) | 88.2 (8.3) |
| CE2 | Silcone oil | 4.4 (0.0) | 2.5 (1.1) | 5.9 (3.3) |
| CE3 | Grease | 155.0 (3.5) | 3.5 (0.2) | 3.9 (0.3) |
| IE1 | GUI | 40.5 (4.7) | 26.6 (1.3) | 44.3 (5.5) |
| IE2 | 3M FBFF | 71.4 (12.7) | 23.1 (9.4) | 46.3 (7.2) |
| IE3 | 3M FSF | 46.3 (1.0) | 17.4 (2.5) | 42.6 (5.7) |
| IE4 | Bis-GMA/HEMA 50/50 | 0.1 (0.0) | 57.4 (4.7) | 57.5 (8.0) |
| IE5 | Bis-GMA/HEMA 90/10 | 20.3 (2.6) | 22.0 (9.1) | 28.3 (11.3) |

As can be taken from the results shown in Table 2, the extrusion force for expressing a dental material contained in a packaging device onto the inner surface of which a lubricant composition according to the invention has been applied is reduced compared to the situation where no lubricant composition has been applied. This was also confirmed for the situation where the dental material was stored for 14 days at 50° C. to simulate severed storage conditions.

As the lubricant composition comprises components and optionally filler materials which are typically present in dental materials, the components or the lubricant composition do not have a negative impact on the performance of the dental material stored in the packaging device.

The invention claimed is:

1. A dental product comprising
a packaging device comprising a compartment with a front end and a rear end, an inner surface and an inner diameter,
a layer of lubricant composition on the inner surface of the compartment,
a dental material located in the compartment between the front end and the rear end,
the lubricant composition comprising a monomer ML with an ethylenically unsaturated (meth) acrylate group, and filler FL in an amount of 0 to 65 wt. % with respect to the weight of the lubricant composition,
the dental material being different with respect to its chemical composition from the lubricant composition.

2. The dental product according to the preceding claim, the dental material comprising
a monomer MC with an ethylenically unsaturated group, and
filler FC in an amount of 65 to 85 wt. % with respect to the weight of the dental material.

3. The dental product according to claim 1, the lubricant composition having a viscosity in the range of 1 to 10,000 Pa*s at a temperature of 25° C. and a shear rate of 10 s$^{-1}$.

4. The dental product according to claim 1, monomer ML having a molecular weight Mw in the range of 130 to 1,200 g/mol.

5. The dental product according to claim 1, monomer ML being characterized by the following formula:

$$A_n BA_m$$

with A being an ethylenically unsaturated group,

B being selected from (i) linear or branched $C_1$ to $C_{12}$ alkyl, optionally substituted with functional groups selected from Cl, Br, I, OH, (ii) $C_6$ to $C_{12}$ aryl, optionally substituted with functional groups selected from Cl, Br, I, OH, or (iii) organic group having 4 to 20 carbon atoms bonded to one another by one or more ether, thioether, ester, thioester, thiocarbonyl, amide, urethane, carbonyl and/or sulfonyl linkages, m, n being independently selected from 0, 1, 2, 3, 4, 5 or 6, with the proviso that n+m is greater 0.

6. The dental product according to claim 1, monomer MC being different from monomer ML.

7. The dental product according to claim 1, filler FL and filler FC being same or different and comprising a nano-sized filler.

8. The dental product according to claim 1, the lubricant composition and the dental material comprising in addition an initiator system.

9. The dental product according to claim 1, the lubricant composition not comprising the following components alone or in combination:
silicone oil in an amount of more than 0.5 wt. %;
an acidic polymerizable component in an amount of more than 1 wt. %.

10. The dental product according to claim 1, the packaging device further comprising at least one of the following:
a nozzle at the front end of the compartment;
a moveable piston located within the compartment.

11. The dental product according to claim 1, the packaging device being characterized by the following features alone or in combination:
the compartment having a volume of 0.1 ml to 100 ml;
the ratio of length to inner diameter of the compartment being in the range of 25/1 to 3/1.

12. A process for producing a dental product, in particular the dental product described in claim 1, the process comprising the steps of
providing a packaging device comprising a compartment with a front end and a rear end, an inner surface and an inner diameter, a dental material, and a lubricant composition, applying a layer of a lubricant composition to the inner surface of the compartment, filling the compartment to which the layer of lubricant composition has been applied with the dental material.

13. A process for dispensing the dental material from the dental product described in claim 1, the process for dispensing comprising the step of applying force to the dental material located at the rear end of the compartment of the packaging device, the force being in a range of 5 to 60 N.

14. A kit of parts comprising the dental product according to claim 1, an applier for dispensing the dental material from the packaging device, and optionally one or more of the following: a dental adhesive; a dental primer; a dental cement; a dental curing light; an instruction for use.

15. Use of a lubricant composition for reducing the extrusion force needed for dispensing a dental material from a packaging device comprising a compartment, the lubricant composition, the dental material and the packaging device being as described in claim 1.

\* \* \* \* \*